United States Patent
Ochi et al.

(10) Patent No.: US 9,150,058 B2
(45) Date of Patent: *Oct. 6, 2015

(54) PNEUMATIC TIRE

(75) Inventors: Naoya Ochi, Higashimurayama (JP); Takaaki Kojima, Kodaira (JP)

(73) Assignee: BRIDGESTONE CORPORATION, Tokyo (JP)

( * ) Notice: Subject to any disclaimer, the term of this patent is extended or adjusted under 35 U.S.C. 154(b) by 559 days.

This patent is subject to a terminal disclaimer.

(21) Appl. No.: 13/322,480

(22) PCT Filed: May 21, 2010

(86) PCT No.: PCT/JP2010/003448
§ 371 (c)(1),
(2), (4) Date: Dec. 13, 2011

(87) PCT Pub. No.: WO2010/137273
PCT Pub. Date: Dec. 2, 2010

(65) Prior Publication Data
US 2012/0125501 A1 May 24, 2012

(30) Foreign Application Priority Data

May 25, 2009 (JP) ................................. 2009-125747
Jun. 10, 2009 (JP) ................................. 2009-139600

(51) Int. Cl.
B60C 11/11 (2006.01)
B60C 11/12 (2006.01)
B60C 11/03 (2006.01)

(52) U.S. Cl.
CPC ............. *B60C 11/11* (2013.01); *B60C 11/0306* (2013.04); *B60C 11/12* (2013.01); *B60C 2011/1209* (2013.04); *B60C 2011/1245* (2013.04)

(58) Field of Classification Search
CPC .... B60C 11/11; B60C 11/12; B60C 11/0306; B60C 11/0309; B60C 2011/1209; B60C 11/03
USPC ................... 152/209.18, 209.1, 209.2, 209.3, 152/209.26, 209.27, 209.28, DIG. 3
IPC ......................................................... B60C 11/11
See application file for complete search history.

(56) References Cited

U.S. PATENT DOCUMENTS

| 4,278,121 A | 7/1981 | McDonald |
| 6,715,522 B1 * | 4/2004 | Wada ........................ 152/209.18 |

(Continued)

FOREIGN PATENT DOCUMENTS

| DE | 10 2006 041 142 A1 | 3/2008 |
| EP | 1 336 510 A1 | 8/2003 |

(Continued)

OTHER PUBLICATIONS

Chinese Office Action, dated Nov. 11, 2013, issued in corresponding Chinese Patent Application No. 201080031001.2.

(Continued)

*Primary Examiner* — Justin Fischer
*Assistant Examiner* — Philip N Schwartz
(74) *Attorney, Agent, or Firm* — Sughrue Mion, PLLC

(57) ABSTRACT

A pneumatic tire comprises, in a tread portion 1, at least two block groups $G_{B1}$ to $G_{B3}$ whose block number density is within a range of 0.003 pieces/mm² to 0.04 pieces/mm². At least one block group $G_{B2}$ includes block 4 in which lateral length $BW_2$ is larger that its longitudinal length $BL_2$.

6 Claims, 16 Drawing Sheets

(56) References Cited

U.S. PATENT DOCUMENTS

| | | | |
|---|---|---|---|
| 6,840,296 B2 * | 1/2005 | Suzuki et al. | 152/209.17 |
| 8,720,506 B2 * | 5/2014 | Ochi | 152/209.15 |
| 2006/0162831 A1 * | 7/2006 | Ishida | 152/209.18 |

FOREIGN PATENT DOCUMENTS

| EP | 2 418 102 A1 | | 2/2012 | |
|---|---|---|---|---|
| GB | 520231 | * | 4/1940 | B60C 11/00 |
| GB | 520231 A | | 4/1940 | |
| JP | 64-36507 A | | 2/1989 | |
| JP | 04-365608 A | | 12/1992 | |
| JP | 07-276919 A | | 10/1995 | |
| JP | 08-002215 A | | 1/1996 | |
| JP | 08-318710 A | | 12/1996 | |
| JP | 2000-94907 A | | 4/2000 | |
| JP | 2002-192914 A | | 7/2002 | |
| JP | 2008-285004 A | | 11/2008 | |

OTHER PUBLICATIONS

Extended European Search Report, dated Jul. 15, 2013, issued in corresponding European Patent Application No. 10780234.0.

Japanese Office Action issued in Japanese Application No. 2009-139600 dated Apr. 16, 2013.

Chinese Office Action issued in Chinese Application No. 201080031001.2 dated Jun. 20, 2013.

Chinese Office Action, dated Apr. 22, 2014, issued in corresponding Chinese Patent Application No. 201080031001.2.

* cited by examiner (a)

(b)

PNEUMATIC TIRE

CROSS REFERENCE TO RELATED APPLICATION

This application is a National Stage of International Application No. PCT/JP2010/003448, filed on May 21, 2010, claiming priority based on Japanese Patent Application Nos. 2009-125747, filed on May 25, 2009 and JP 2009-139600, filed Jun. 10, 2009, the contents of all of which are incorporated herein by reference in their entirety.

FIELD OF THE INVENTION

The present invention relates to a pneumatic tire having, in a tread portion, a large number of blocks which are defined by grooves. Particularly, the present invention relates to realizing, in addition to dramatic improvement of on-ice performance, balance with other performances.

DESCRIPTION OF THE RELATED ART

In conventional pneumatic tire, in order to improve the on-ice performance and the like by increasing edge effect, it is widely implemented that, as shown in FIG. 14, in the tread portion 100, blocks 103 are formed by longitudinal grooves 101 extending in the tire circumferential direction and lateral grooves 102 extending in the tire width direction, and a plurality of sipes 104 are provided on the blocks 103. In such conventional pneumatic tire, under the demand for higher driving, braking and cornering performances, in order to arrange more sipes 104 on the blocks 103 and to improve the on-ice performance by enlarged ground contact area, the number of block row is reduced to 3 to 9 and each block 103 is formed into oblong shape along the tire circumferential direction, as is disclosed in Japanese Patent Application Laid-Open Publication No. 2002-192914.

RELATED ART DOCUMENT

Patent Literature

Patent Literature 1: Japanese Patent Application Laid-Open Publication No. 2002-192914

SUMMARY OF THE INVENTION

Problems to be Solved by the Invention

Disadvantageously, in such conventional pneumatic tire, since divided block portions 103a divided by the sipes 104 become thin and the stiffness thereof are reduced, the divided block portions will collapse when contacting the ground. As a result, the ground contact property is exacerbated and it is therefore difficult to obtain sufficient on-ice performance consistent with vehicle performance of recent years. In addition, since each block 103 is large, water screen between ice and tire at the central region of the block 103 can not be removed during braking by only providing the sipes 104. From this reason as well, it is difficult to significantly improve the on-ice performance. On the other hand, considering the pneumatic tire to be used for running not only on ice road but also wet road or dry road, it is necessary to balance the on-ice performance and other performances such as driving stability on wet road or dry road, or anti-wear performance.

Therefore, the present invention aims at solving these problems, and an object thereof is, in addition to dramatic improvement of on-ice performance, to balance with other performances, by optimizing a tread pattern.

Means for Solving the Problems

In order to achieve the object described above, the present invention provides a pneumatic tire comprising, in a tread portion, at least one block group, the block group being composed of a plurality of independent blocks defined by grooves, wherein block number density D (pieces/mm$^2$) of the block group is within a range of 0.003 (pieces/mm$^2$) to 0.04 (pieces/mm$^2$), the block number density D being represented by the formula:

$$D = a / \{PL \times W \times (1-N/100)\}$$

wherein PL (mm) represents a reference pitch length of the block in the block group, W (mm) represents a width of the block group, a (pieces) represents the number of the blocks existing in a reference zone of the block group, the reference zone being demarcated by the reference pitch length PL and the width W, and N (%) represents a negative ratio in the reference zone, wherein the at least one block group includes block whose lateral length is larger than longitudinal length thereof.

Here, the term "block group" is defined as aggregation of blocks having same reference pitch length. The term "reference pitch length of the block" refers to one or more than one unit of a repeating pattern, in the tire circumferential direction, of the block in the block group. For example, in a case where the repeating pattern in the tire circumferential direction is composed of one block and one groove adjacent to the block, the reference pitch length of the block can be calculated by adding the length of the block in the tire circumferential direction to the length of the adjacent groove in the tire circumferential direction. Further, the term "width of the block group" refers to the distance which is obtained by measuring the block group along the tire width direction. Furthermore, the term "block number density" refers to how many blocks exist in per unit of real contacting area (total area of all blocks in the reference zone) in the reference zone, as density. In addition, the term "longitudinal length" of the block refers to a maximum length of the block in the tire circumferential direction. The term "lateral length" of the block refers to a maximum length of the block in the tire width direction.

According the pneumatic tire of the present invention, since the block number density of the block group is within the range of 0.003 (pieces/mm$^2$) to 0.04 (pieces/mm$^2$), blocks can be arranged in close formation, whereby it is possible to increase a total periphery length (total edge length) of the blocks. Thus, it is possible to obtain more effective edges for on-ice running than the conventional sipe type winter tire, without causing the reduction of block stiffness. Further, each of the surface area of the block can be much smaller than the conventional one, whereby it is possible to improve ground contact property of each block, and it is possible to reduce the distance from the central region to peripheral region of the block to effectively remove the water screen in the central zone of the block. Furthermore, since the ratio of the longitudinal length and lateral length of the block (aspect ratio) is varied with respect to each block group, performance design for the purpose can be made possible.

Therefore, according to the pneumatic tire of the present invention, with the aforementioned interaction, excellent ground contact property and edge effect, effective removal of water screen by means of blocks can be obtained, in addition to these, by providing block group with different block aspect ratio, it is possible to not only dramatically improve on-ice performance, but to balance with other performances such as driving stability or anti-wear performance.

In the pneumatic tire of the present invention, it is preferable that the pneumatic tire comprises at least two block groups in the tread portion, wherein the lateral length of each block in at least one of the block groups is larger than the longitudinal length thereof, and the longitudinal length of each block in residual block group is larger than the lateral length thereof.

In the pneumatic tire of the present invention, it is preferable that the tread portion has a center region and shoulder regions, the center region being, on both side of a tire equatorial plane, 10% to 40% of a tread width for each side, each of the shoulder regions being, from each tread end in the tire width inward direction, 40% to 10% of the tread width;

wherein the blocks in the center region and the blocks in the shoulder region respectively compose the block groups, wherein the lateral length of each block in the center region is larger than the longitudinal length thereof, and the longitudinal length of each block in the shoulder region is larger than the lateral length thereof.

In the pneumatic tire of the present invention, it is preferable that the pneumatic tire comprises at least three block groups, wherein the longitudinal length of the each block in at least one of the three block groups equals to the lateral length thereof.

In the pneumatic tire of the present invention, it is preferable that the pneumatic tire further comprises, in the tread portion, at least one circumferential main groove including see-through groove portion, the see-through groove portion linearly extending in the tire circumferential direction.

In the pneumatic tire of the present invention, it is preferable that at least one sipe is provided on at least one block in at least one block group.

Effect of the Invention

According to the present invention, in addition to dramatic improvement of on-ice performance, it is possible to balance with other performances.

BEST MODE FOR IMPLEMENTING THE INVENTION

Figure 1:
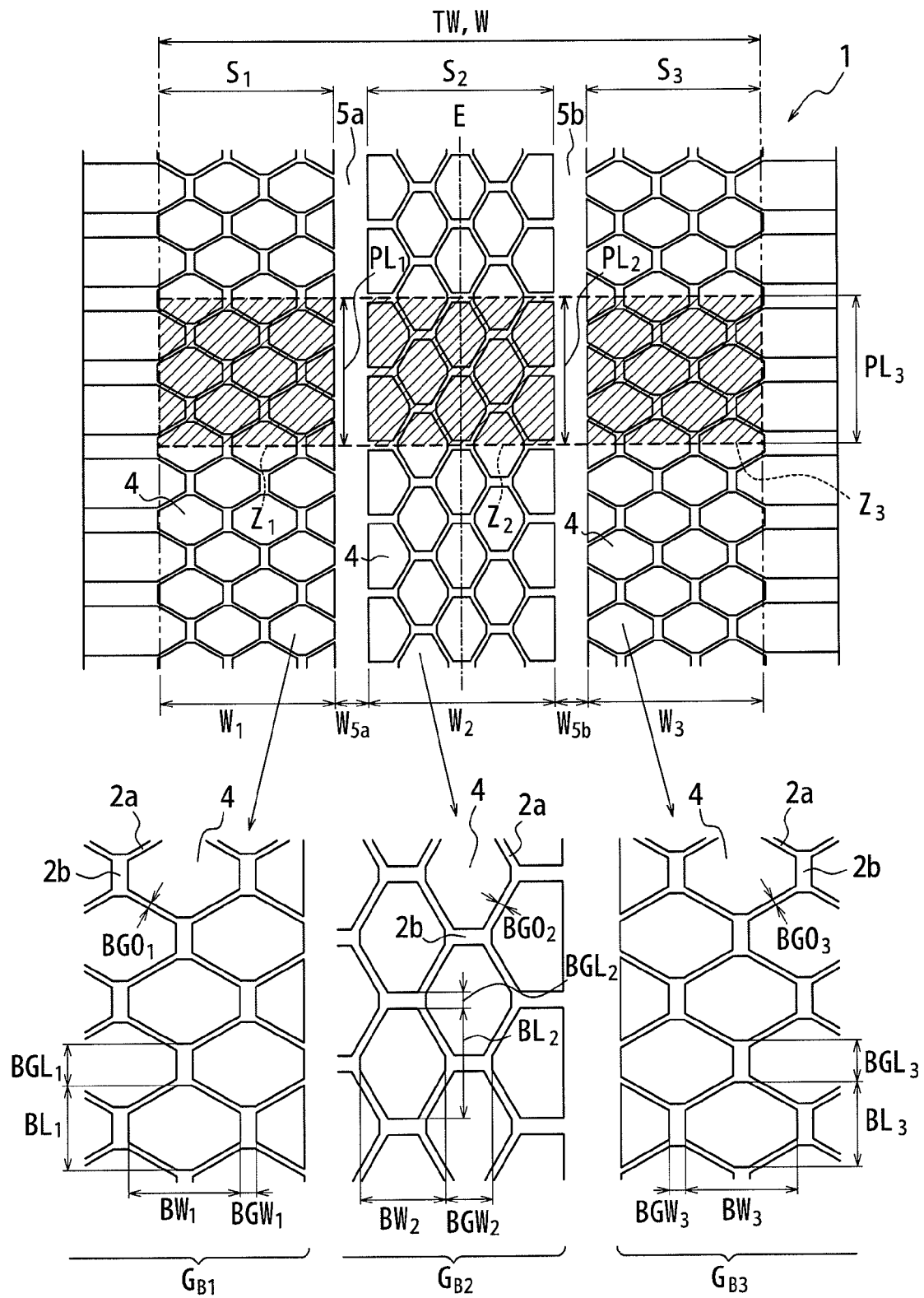
FIG. 1 is a partial development view showing a tread pattern of a pneumatic tire (tire of Example 1) according to an embodiment of the present invention.

Hereinafter, embodiments of the present invention will be described with reference to the drawings. FIG. 1 is a partial development view showing a tread pattern of a pneumatic tire (hereinafter, referred to as "tire") according to an embodiment of the present invention. Note that, in the drawing, a up and down direction represents a tire circumferential direction, and a right and left direction (direction perpendicular to an equatorial plane E) represents a tire width direction.

The tire of the present embodiment comprises, although not shown in the drawings, a conventional tire structure which includes a carcass toroidally extending between a pair of right and left bead cores, a belt provided radially outside of the crown portion of this carcass, and a tread portion provided radially outside the belt. The tire has a tread pattern illustrated in FIG. 1 on the tread portion.

As shown in FIG. 1, the tread portion 1 has first to third regions $S_1$ to $S_3$ zoned in the tire width direction. The first and third regions $S_1$, $S_3$ (shoulder regions) are positioned adjacent to tread ends, and the second region $S_2$ (center region) is positioned between these first and third regions $S_1$, $S_3$ and including the tire equatorial plane E. The first to third regions $S_1$ to $S_3$ are provided with a large number of blocks 4 at regular intervals, the blocks 4 being formed by a plurality of longitudinal grooves 2a extending in the tire circumferential direction and a plurality of lateral grooves 2b extending in the tire width direction to connect the adjacent longitudinal grooves 2a, in the tire width direction, with one another. Each of the regions $S_1$ to $S_3$ is filled with lots of blocks 4, whereby block groups $G_{B1}$, $G_{B2}$, $G_{B3}$ are composed. The center region $S_2$ is, on both side of the tire equatorial plane E, 10% to 40% of a tire contact width TW for each side; each of the shoulder regions $S_1$, $S_3$ is, from each tread end inward in the tire width direction, 40% to 10% of the tire contact width TW.

The tread portion 1 also has at least one (two, in this example) circumferential main grooves 5a and 5b, each including see-through groove portion linearly extending along the tire circumferential direction. Aforementioned block groups $G_{B1}$ to $G_{B3}$ are arrange so as to share the circumferential main grooves 5a, 5b as boundaries, i.e., the block group $G_{B2}$ of the second region $S_2$ and the block groups $G_{B1}$, $G_{B3}$ of the first and third regions $S_1$, $S_3$ are separated or partitioned by the circumferential main grooves 5a, 5b. The circumferential main grooves 5a, 5b do not close when contacting the ground.

The blocks in the first to third regions $S_1$ to $S_3$ have octagon shapes at their surface and are arranged in zigzag alignment. The size of each block 4 is smaller than that of the conventional pattern shown in FIG. 14, and the density of the blocks 4 is higher than that of the conventional pattern shown in FIG. 14.

Here, when reference pitch lengths of the blocks 4 in the tire circumferential direction are as $PL_1$, $PL_2$, $PL_3$ (mm) (in this example, $PL_1$ to $PL_3$ take same value for the sake of simplicity); when the widths of the block groups $G_{B1}$ to $G_{B3}$ are as $W_1$, $W_2$, $W_3$ (mm); when the numbers of the blocks 4 in reference zones $Z_1$, $Z_2$, $Z_3$ (hatched area in the drawings) are as $a_1$, $a_2$, $a_3$, the reference zones $Z_1$, $Z_2$, $Z_3$ being demarcated by the reference pitch lengths $PL_1$ to $PL_3$ and the widths $W_1$ to $W_3$; and when negative ratios in the reference zones $Z_1$ to $Z_3$ are as $N_1$, $N_2$, $N_3$ (%), block number densities $D_1$, $D_2$, $D_3$ (the number of blocks 4 per unit of real ground contact area in reference zones $Z_1$ to $Z_3$) represented by the formula:

$$D_n = \frac{a_n}{PL_n \times W_n \times (1 - N_n/100)} \quad \text{[Formula 1]}$$

are within a range of 0.003 to 0.04 (piece/mm²). The block number density $D_n$ indicates that how many blocks 4 exist per unit (mm²) of the real ground contact area (which does not include the area of the grooves) of the block group $G_{Bn}$, as a density. Just for reference, in normal winter tire, the block number density $D_n$ is about less than or equal to 0.002. Note that, at the time of counting the number "$a_n$" of the blocks 4 existing in the reference zone $Z_n$, in a case where certain block 4 extends across the both inside and outside of the reference zone $Z_n$ and cannot be counted as one block, the block 4 is counted as a proportion of the remaining area of the block 4 in the reference zone to the surface area of this block 4. For example, the block 4 which extends across both inside and outside of the reference zone $Z_n$ and only a half portion of which exists in the reference zone $Z_n$, can be counted as ½ piece.

In addition, in at least one (one block group $B_{G2}$ in this example) of at least two block groups, the longitudinal length $BL_2$ of the each block 4 is larger than the lateral length $BW_2$ of the block (i.e., $BL_2$>$BW_2$), and in residual block groups $G_{B1}$, $G_{B3}$, the lateral lengths $BW_1$, $BW_3$ are larger than the longitudinal lengths $BL_1$, $BL_3$ (i.e., $BW_1$>$BL_1$; $BW_3$>$BL_3$).

According to the tire of the present embodiment, in the first to third regions $S_1$ to $S_3$, by the effect of arranging the blocks 4 close together, on-ice performance is improved. In a case where the block number densities $D_1$ to $D_3$ in the block groups $G_{B1}$ to $G_{B3}$ are less than 0.003 (piece/mm²), it is difficult to obtain high edge effect without providing sipes. On the other hand, in a case where the number densities $D_1$ to $D_3$ are more than 0.04 (piece/mm²), the blocks 4 become too small to achieve desired block rigidity. If the block number densities D1 to D3 are within a range of 0.0035 to 0.03 piece/mm², it is possible to satisfy both of the stiffness of the blocks 4 and the edge effect at high levels. In the conventional tire, although on-ice performance is improved by providing many sipes on relatively large blocks, the improvement of the on-ice performance is limited by this technique, because the divided block portions between the sipes collapses during contacting the ground, and thus, uniform ground contact of the block is difficult. Compared to this, according to the present invention, since a number of the small blocks 3 are arranged close together by the block number densities $D_1$ to $D_3$ to be within the predetermined range, more increased total edge length than sipe-type winter tire can be provided, and therefore, higher edge effect can be obtained.

Further, in the conventional configuration which is provided with sipes on the relatively large blocks, it is difficult to remove water screen on the ice surface portion corresponding to the block surface central region. Compared to this, according to the present invention, since the block surface area of the block 4 is small, the distance from the central region to the peripheral region of the block surface is small, whereby it is possible to effectively improve the water removal performance.

However, because of required stiffness distributions for each of the regions $S_1$ to $S_3$ to be different depending on aimed performances, if the shape of the each block 4, i.e., the ratio of the each block 4 (ratio of longitudinal length to lateral length) equals one another between the block groups, it becomes difficult to balance the on-ice performance and other performances. Therefore, since a plurality of the block groups $G_{B1}$ to $G_{B3}$ are also provided and performances due to the block stiffness are used properly with respect to each the block groups $G_{B1}$ to $G_{B3}$, the present invention is successful in balancing the on-ice performance and other performances.

That is, in the tread pattern shown in FIG. 1, by providing the blocks 4, whose longitudinal lengths $BL_2$ are larger than the lateral lengths $BW_2$ thereof, near the center of tread including tire equatorial plane E (i.e., in the second region $S_2$), stiffness with respect to the tire circumferential direction can be increased, whereby handling performance on dry/wet road can be improved. On the other hand, by providing the blocks 4, whose lateral lengths $BW_1$, $BW_3$ are larger than the longitudinal lengths $BL_1$, $BL_3$ thereof, near the tread end (i.e., in the first and third regions $S_1$, $S_3$), stiffness with respect to the lateral direction in the tread side regions, whereby driving stability on dry/wet road and anti-wear performance in the shoulder regions can be improved.

Note that, according to the tire of the present embodiment, by providing, in the tread portion 1, the circumferential main grooves 5a, 5b extending along the tire circumferential direction, the tread portion 1 is separated or divided into the block group $G_{B2}$ of the second region $S_2$ and the block groups $G_{B1}$, $G_{B3}$ of the first and third regions $S_1$, $S_3$ by the circumferential main grooves 5a, 5b, whereby the functions of respective block groups $G_{B1}$ to $G_{B3}$ can be distinctly separated in the tread portion 1. Therefore, in addition to improvement of water evacuation property, aimed performances can be surely achieved.

Further, according to the tire of the present embodiment, by arranging the blocks 4 in zigzag alignment in the block groups $G_{B1}$ to $G_{B3}$ of the first to third regions $S_1$ to $S_3$, more blocks 4 can be formed and the edges thereof can fulfill their function one after the other when the tire is rotated, whereby the edge effect can be exerted in a more effective manner. In addition, by arranging the blocks 4 in zigzag alignment, the ground contact timings of blocks 4, which are adjacent to one another in the tire width direction, can differ between the blocks 4, whereby pattern noise can also be reduced. Yet further, by arranging the blocks 4 in zigzag alignment, the high-density arrangement of blocks can be easily realized. By arranging blocks 4 in zigzag alignment in tire circumferential direction and increasing the block number densities $D_1$ to $D_3$, the adjacent blocks 4 can support each other when high load is applied to the blocks 4, whereby it is possible to further increase the stiffness of the blocks 4, then to further improve the on-ice performance.

Figure 2:
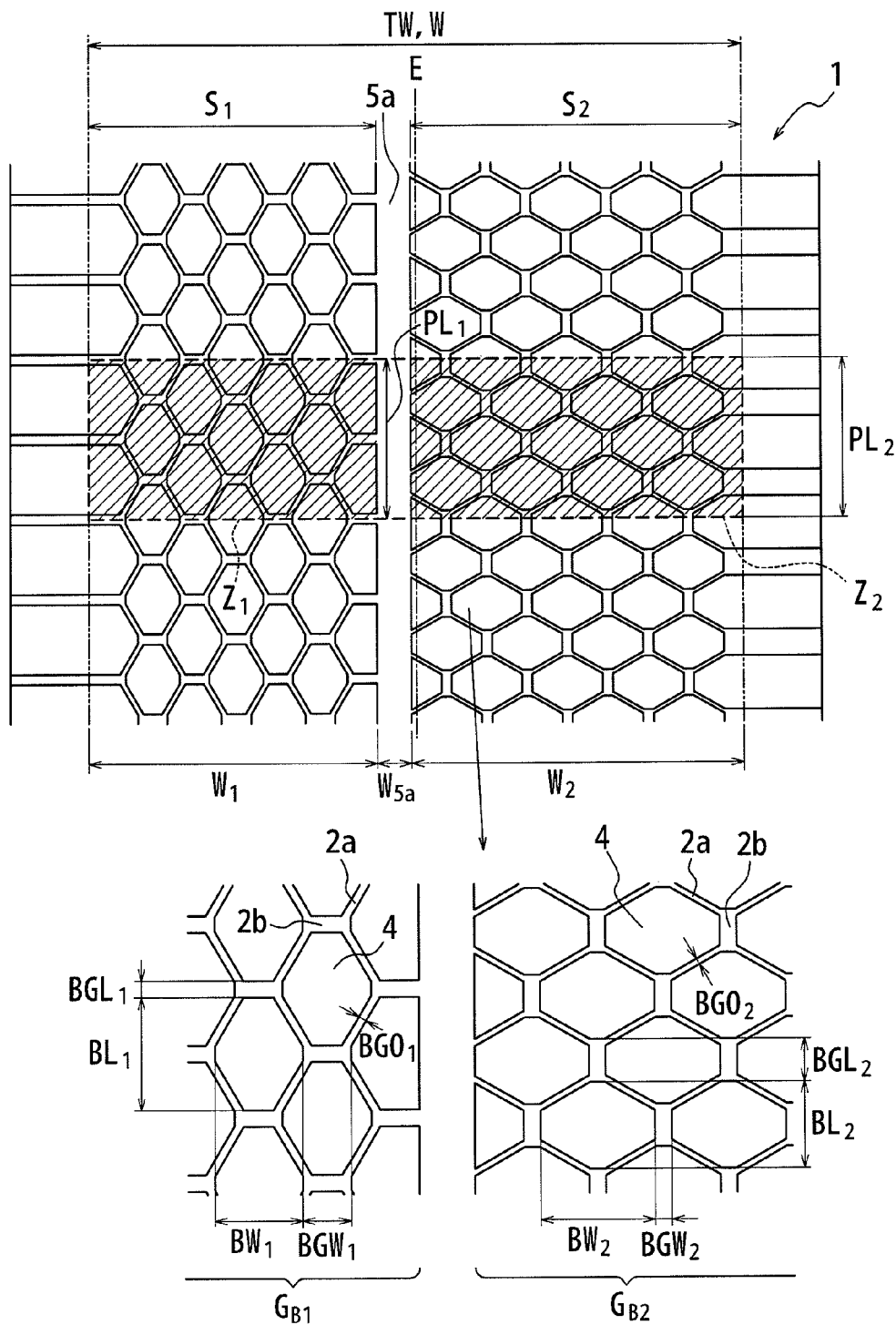
FIG. 2 is a partial development view showing a tread pattern of a pneumatic tire (tire of Example 2) according to another embodiment of the present invention.

Next, another embodiment of the present invention will be described. FIG. 2 is a partial development view showing a tread pattern of a pneumatic tire according to another embodiment of the present invention. It should be noted that like elements as those in FIG. 1 are designated with like reference numerals and detailed descriptions thereof are omitted.

The tread pattern of the embodiment shown in FIG. 2 has a first region $S_1$ which lies on proximal side (i.e., inside) from a vehicle in tire mounted state to the vehicle and a second region $S_2$ which lies on distal side (i.e., outside) from the vehicle in tire mounted state to the vehicle. In the first region $S_1$, the longitudinal lengths $BL_1$ of the blocks 4 are larger than the lateral lengths $BW_1$ thereof (i.e., $BL_1 > BW_1$), and in the second region $S_2$, the lateral lengths $BW_2$ of the blocks 4 are larger than the longitudinal lengths $BL_2$ thereof (i.e., $BW_2 > BL_2$). The block number densities $D_1$, $D_2$ of the block groups $G_{B1}$, $G_{B2}$ of the first and second regions $S_1$, $S_2$ are within the range of 0.003 pieces/mm² to 0.04 pieces/mm². A circumferential main groove $5a$ extending along the tire circumferential direction is provided between the first and second regions $S_1$, $S_2$.

According to the tread pattern of the present embodiment, in the outside region $S_2$ where great lateral force will be applied when cornering, since the stiffness against the lateral direction can be increased, both of cornering performance and anti-wear performance can be increased as well as the improvement of on-ice performance. In the inside region $S_1$, since the stiffness against the circumferential direction can be increased, anti-uneven wear performance and traction/braking performance can be improved.

Figure 3:
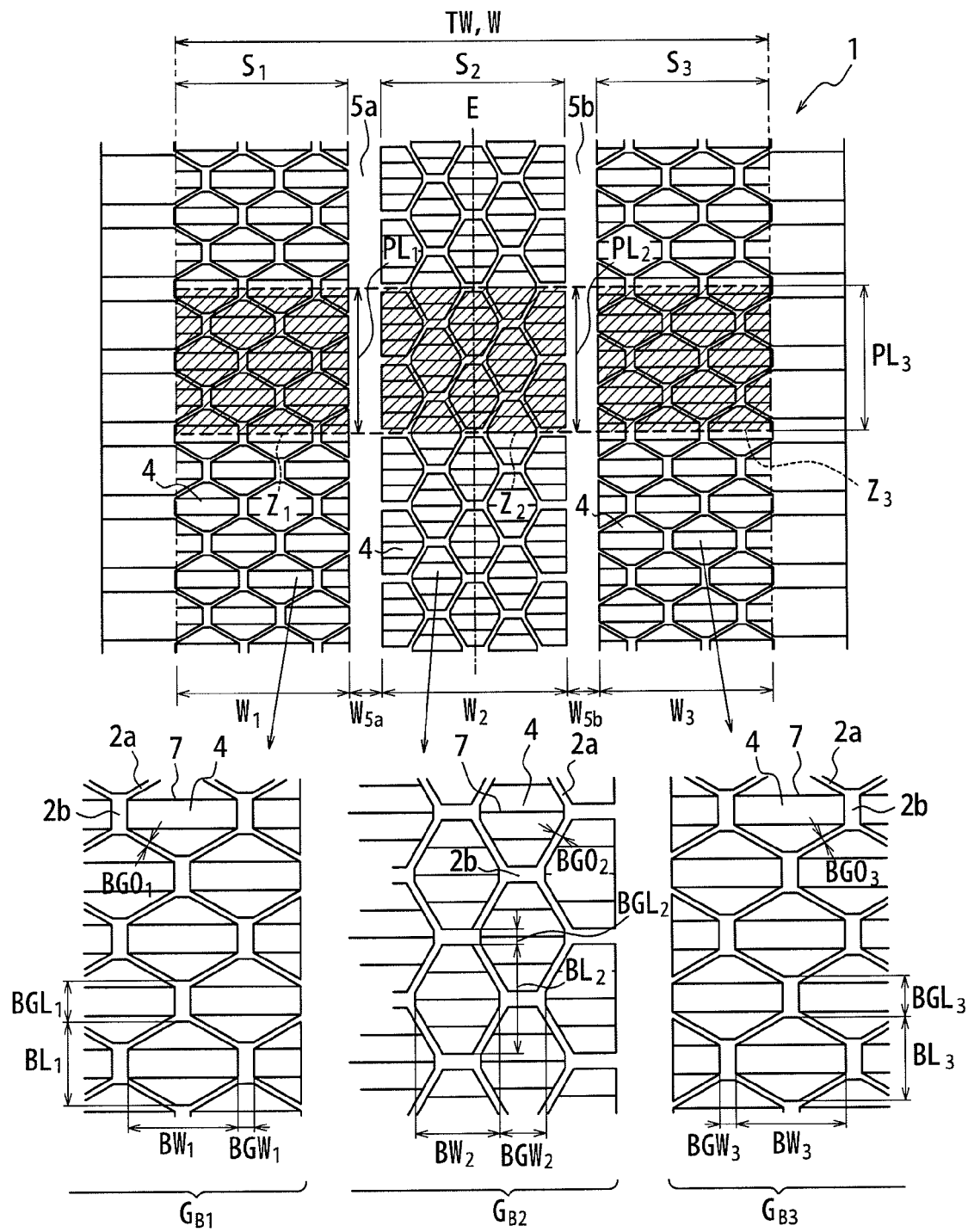
FIG. 3 is a partial development view showing a tread pattern of a pneumatic tire (tire of Example 3) according to another embodiment of the present invention.

Next, another embodiment of the present invention will be described. FIG. 3 is a partial development view showing a tread pattern of a pneumatic tire according to another embodiment of the present invention. It should be noted that like elements as those in FIG. 1 are designated with like reference numerals and detailed descriptions thereof are omitted.

In the tread pattern of the embodiment shown in FIG. 3, a plurality of sipes 7 extending in the tire width direction are provided on the blocks 4 of at least one (all in this example) of the block groups $G_{B1}$ to $G_{B3}$ of the tread pattern shown in the FIG. 1. In the block groups $G_{B1}$, $G_{B3}$, two sipes 7 are provided on the respective blocks 4. In the block group $G_{B2}$, three sipes 7 are provided on the respective blocks 4.

According to the tire of the present embodiment, by providing the sipes 7 on the blocks 4 in their respective block groups $G_{B1}$ to $G_{B3}$, on-ice/snow performance can be further improved. Further, as this embodiment, by providing more sipes 7, which extend in the width direction, on the blocks 4 whose longitudinal lengths $BL_2$ are larger than their lateral lengths $BW_2$ (i.e., blocks 4 of the block group $G_{B2}$) than on the blocks 4 whose lateral lengths $BW_1$, $BW_3$ are larger than their longitudinal lengths $BL_1$, $BL_3$ (i.e., blocks 4 of the block groups $G_{B1}$, $G_{B3}$), more effective sipes for the on-ice/snow performance can be provided.

Figure 4:
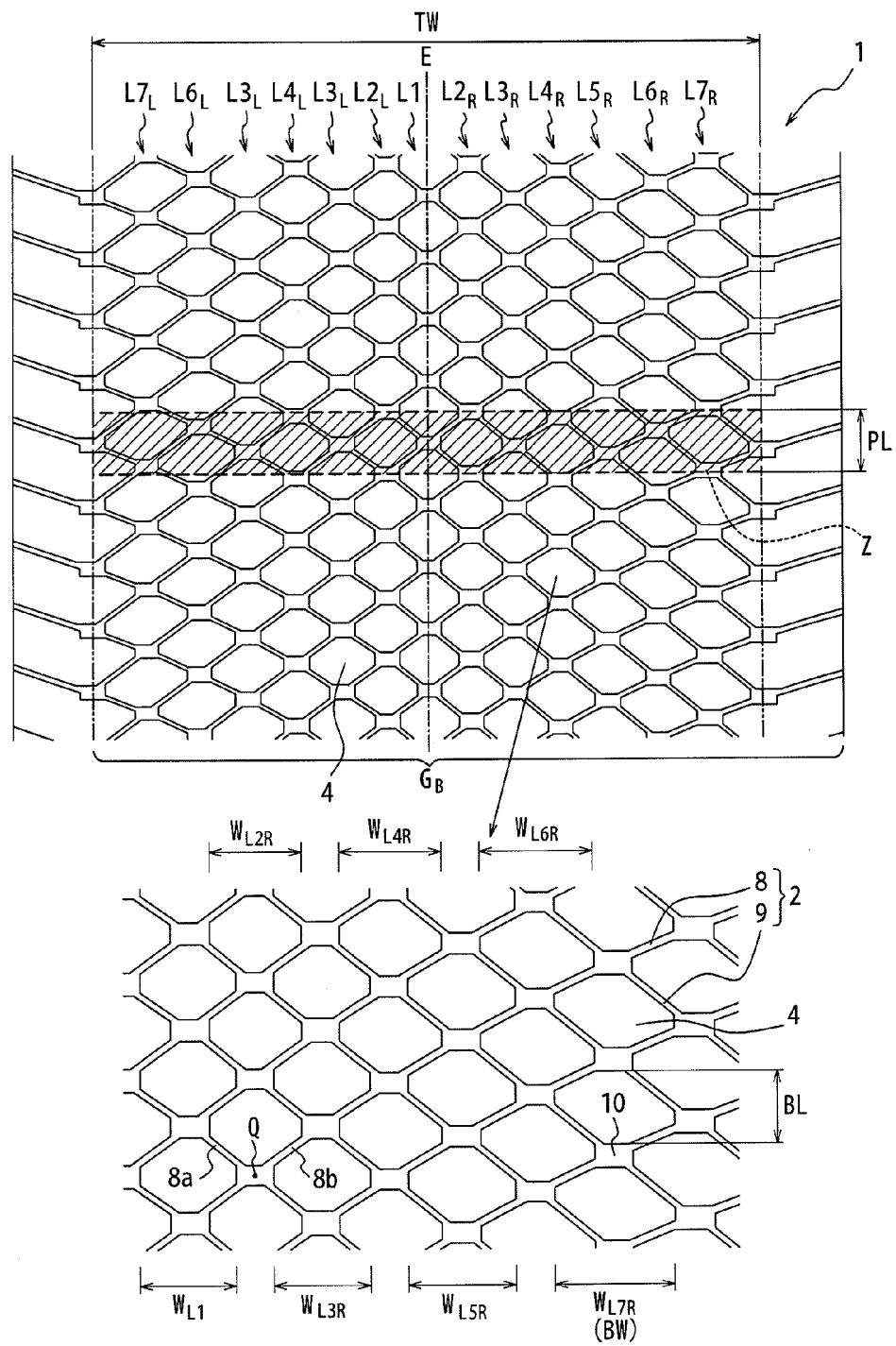
FIG. 4 is a partial development view showing a tread pattern of a pneumatic tire according to another embodiment of the present invention.

Next, another embodiment of the present invention will be described. FIG. 4 is a partial development view showing a tread pattern of a pneumatic tire according to another embodiment of the present invention. As shown in FIG. 4, the tire comprises, in its tread portion 1, a block group $G_B$ composed of a plurality of close-arranged blocks 4 which are independently defined by grooves 2. In the block group $G_B$, each of the blocks 4 is arrayed along the tire circumferential direction, whereby a plurality of block lines $L_1$ to $L7_R$, $L7_L$ are formed in the tire width direction. The block group $G_B$ includes at least one block 4 whose lateral length BW is larger than its longitudinal length BL.

The blocks 4 are defined by a plurality of V-shaped grooves 8 and a plurality of crossing grooves 9. The respective V-shaped groove 8 includes a pair of inclined grooves $8a$, $8b$ which have apex Q on the symmetry block line L1 and extend from the apex Q, in counter direction with respect to the tire circumferential direction, toward the tread end. The crossing grooves 9 intersect with the V-shaped grooves 8. At the crossing portions of the V-shaped grooves 8 and the crossing grooves 9, rectangular groove portions 10 having approximate rectangular shape in flat view are provided. Therefore, the contacting surface shape of each block 4 is formed into approximate octagon shape. The inclined grooves $8a$, $8b$ extend in a curved line whose inclined angle with respect to the tire circumferential direction increase gradually toward outside in the tire width direction. As a result, the profile of the block 4 at surface has straight sides situated next to the linear crossing groove and curved sides situated next to the curved inclined groove.

The block lines L1 to $L7_R$, $L7_L$ have at least one (one in this example) symmetric block line L1 composed of blocks 4 which have axisymmetric shape with respect to the tire circumferential direction and asymmetric block lines $L2_R$, $L2_L$ to $L7_R$, $L7_L$ composed of blocks which locate outside of the symmetric block line L1 in the tire width direction and have asymmetric shape with respect to the tire circumferential direction.

Figure 5:
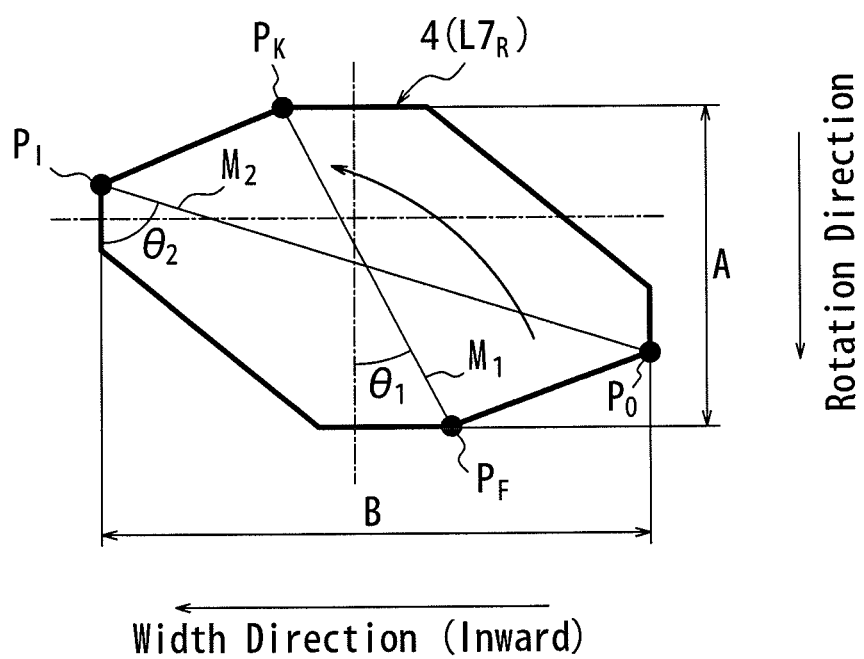
FIG. 5 shows an enlarged view of one of blocks in the tread pattern of FIG. 4.

Here, refereeing to FIG. 5 for explanation about the block 4 in the asymmetric block line $L7_R$ as a example, kick-out end most point $P_K$, in the tire circumferential direction, of each block 4 of the asymmetric block lines $L2_R$, $L2_L$ to $L7_R$ to $L7_L$ is inside in the tire width direction with respect to step-in end most point $P_F$ in the tire circumferential direction. The step-in end most point $P_F$ in the tire circumferential direction is outside in the tire width direction with respect to the kick-out end most point $P_K$. Angle $\theta_1$ of a straight line $M_1$ connecting the kick-out end most point $P_K$ and the step-in end most point $P_F$ with respect to the tire circumferential direction becomes large toward outside of the symmetric block line L1 in the tire width direction. That is, in each block 4 of the asymmetric block lines $L2_R$, $L2_L$ to $L7_R$ to $L7_L$, the step-in end most point $P_F$ shifts to outside in the tire width direction as the block close to the shoulder side.

In addition, each block 4 of the asymmetric block lines $L2_R$, $L2_L$ to $L7_R$ to $L7_L$ has asymmetric shape with respect to the tire width direction. The innermost point $P_I$, in the tire width direction, of the block 4 locates kick-out side, with respect to the tire circumferential direction, of the outermost point $P_O$ in the tire width direction. The outermost point $P_O$, in the tire width direction, of the block 4 locates step-in side, with respect to the tire circumferential direction, of the innermost point $P_I$ in the tire width direction. Angle $\theta_2$ of a straight line $M_2$ connecting the innermost $P_I$ and the outermost point $P_O$ with respect to the tire circumferential direction becomes small toward outside of the symmetric block line L1 in the tire width direction.

Further, in the tire of present embodiment, when a projection length of the straight line $M_1$ connecting the kick-out end most point $P_K$ and the step-in end most point $P_F$ to a plane along the tire circumferential direction is as A, and a projection length of the straight line $M_2$ connecting the innermost $P_I$ and the outermost point $P_O$ to a plain along the tire width direction is as B, the relation A/B<1 is fulfilled and the A/B becomes small toward outside of the symmetric block line L1 in the tire width direction.

Therefore, the widths $W_{L1}$ to $W_{L7R}$, $W_{L7L}$ of the block lines L1 to L7$_R$, L7$_L$ become large from the inner block line in the tire width direction toward the outer block line (i.e., $W_{L1}<W_{L2R}<W_{L3R}<W_{L4R}<W_{L5R}<W_{L6R}<W_{L7R}$, in the right half of the pattern; and $W_{L1}<W_{L2L}<W_{L3L}<W_{L4L}<W_{L5L}<W_{L6L}<W_{L7L}$, in the left half of the pattern.).

It should be noted that, in the block group $G_B$, the block number density D as density of blocks 4 is within the range of 0.003 (pieces/mm$^2$) to 0.04 (pieces/mm$^2$).

According to the tire of present embodiment, since the kick-out end most point $P_K$, in the tire circumferential direction, of each block 4 of the asymmetric block lines L2$_R$, L2$_L$ to L7$_R$ to L7$_L$ is inside in the tire width direction with respect to step-in end most point $P_F$ and the angle $\theta_1$ of a straight line $M_1$ connecting the kick-out end most point $P_K$ and the step-in end most point $P_F$ with respect to the tire circumferential direction becomes large toward outside in the tire width direction, the widths $W_{L1}$ to $W_{L7R}$, $W_{L7L}$ of the block lines L1 to L7$_R$, L7$_L$ become large toward outside in the width direction. Therefore, block stiffness in lateral direction can be increased in accordance with characteristics in which lateral force become large toward the shoulder side during cornering, whereby driving stability during cornering can be increased.

Figure 6:
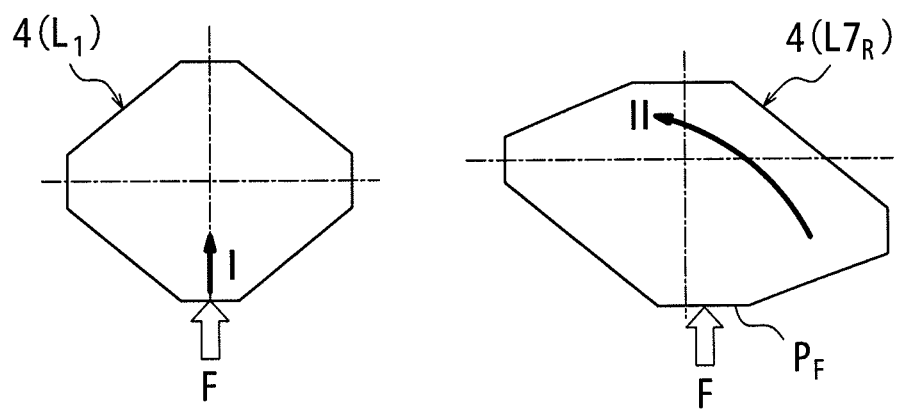
FIG. 6 illustrates deformation of blocks in the tread pattern of FIG. 4: (a) shows a block in the pattern center and a block outside of the center block in tire width direction; and (b) roughly shows deformation directions of blocks in the whole of the pattern.
Figure 6:
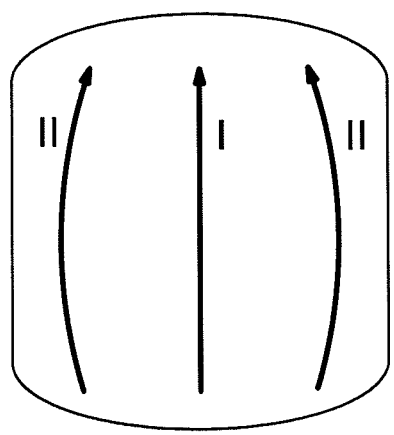

Further, since the angle $\theta_1$ of the straight line $M_1$ connecting the kick-out end most point $P_K$ and the step-in end most point $P_F$ with respect to the tire circumferential direction becomes large toward outside in the tire width direction, in a case where a force F in the tire circumferential direction is applied by traction as shown FIG. 6, deformation directions of the blocks 4 can be trained on center side (indicated direction by arrows I and II in FIG. 6(a), (b)), whereby straight traveling performance can be improved. Furthermore, since the inclined angles of the inclined grooves 8a, 8b with respect to the tire circumferential direction gradually increase toward outward in the tire width direction, the grooves can be form along streamlines of water on the tread surface, whereby efficient water evacuation can be obtained. Yet further, since the sides of the block 4 next to the linear crossing grooves 8a, 8b are made in curved shape, smooth water flow through the inclined grooves 8a, 8b can be obtained, whereby the water evacuation performance can be further improved.

Yet further, according to the tire of the present embodiment, since blocks 4 defined by the grooves 2 are arranged in close formation, the total edge length of the blocks is increased, therefore, higher edges effect than sipes can be obtained. In addition, since the surface area of each block 4 become small, the ground contact property of respective block 4 is improved. Also, the distance from the central region to peripheral region of the block 4 can be decreased, the water screen in the central zone of the block 4 can be effectively removed when the block contacts to ground.

Therefore, according to the tire of the present embodiment, in the block pattern, driving stability and straight traveling performances can be improved as well as the driving stability on dry road, wet road, and ice/snow road can be improved, and traction performance and water evacuation performance can be improved.

Figure 7:
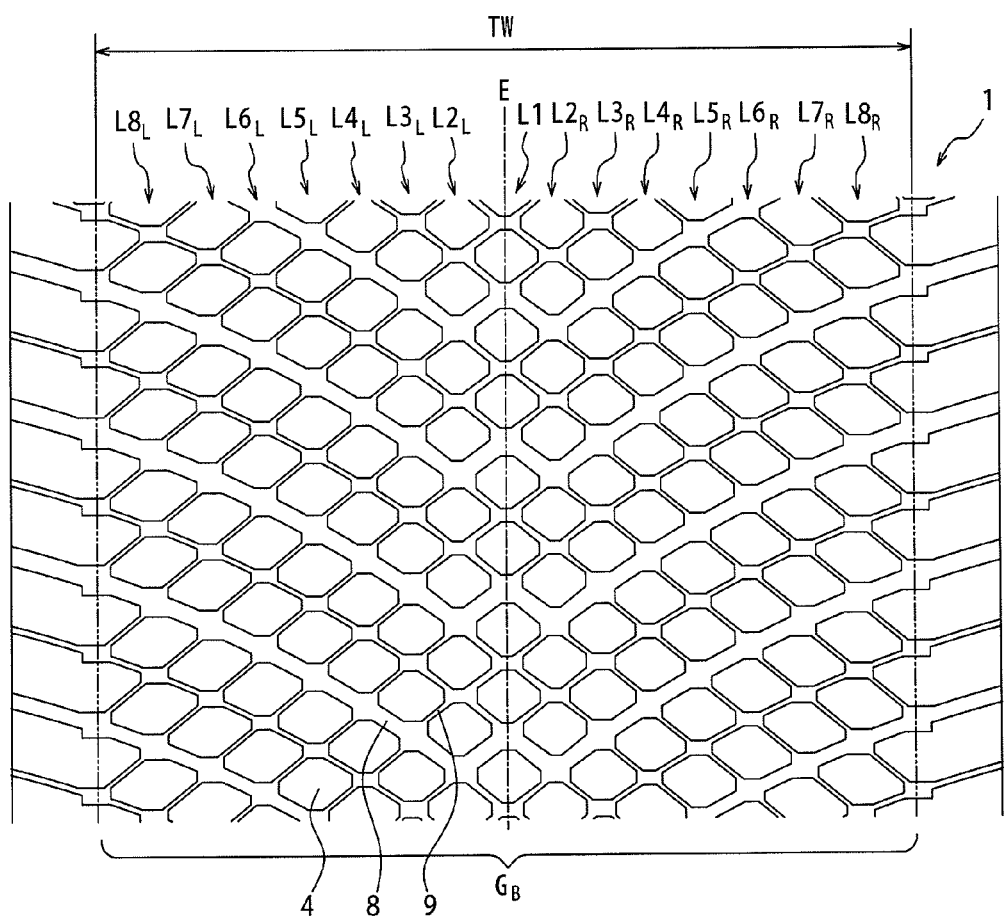
FIG. 7 is a partial development view showing a tread pattern of a pneumatic tire according to another embodiment of the present invention.
Figure 8:
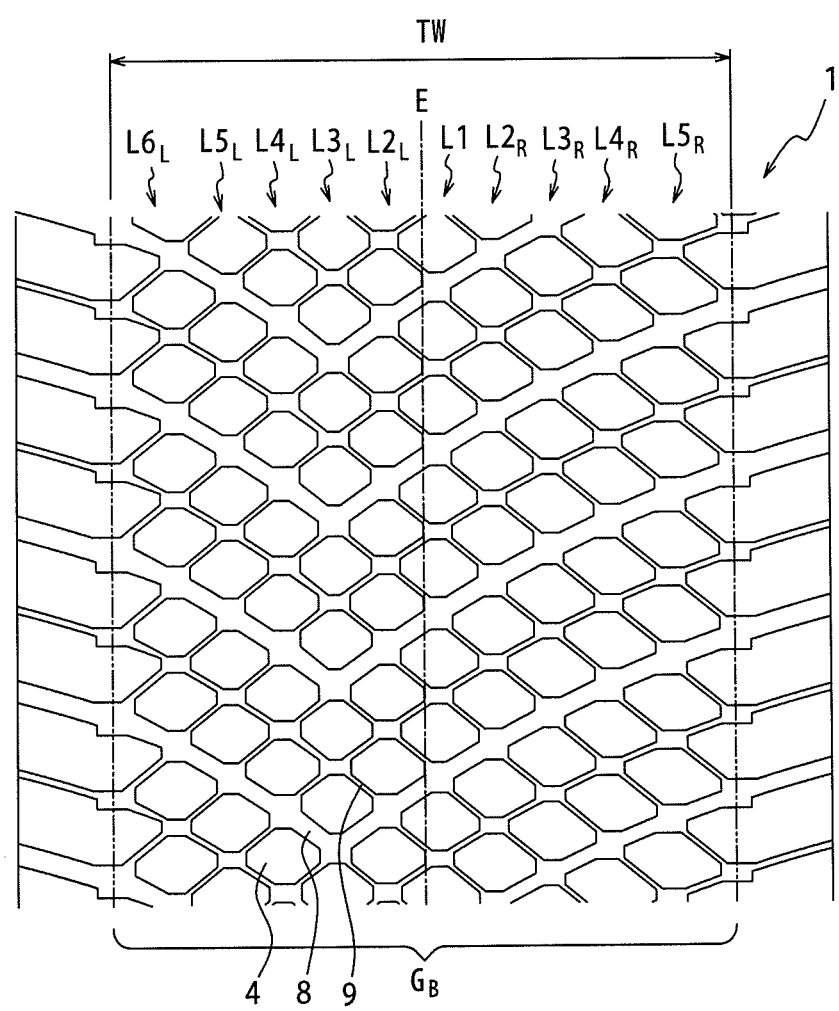
FIG. 8 is a partial development view showing a tread pattern of a pneumatic tire according to another embodiment of the present invention.

It should be noted that, although the symmetric block line is provided only one line in above description, the symmetric block can be provided more than one line, e.g., three lines (block lines L1, L2$_L$, L2$_R$) as shown in FIG. 7. The symmetric block line may be positioned in center of the tread portion (the tire equator) as shown in FIG. 4, or may be positioned near shoulder (i.e., L3$_L$ may be the symmetric block line) as shown in FIG. 8. According to the tire shown in FIG. 8, by positioning the symmetric block line L3L at proximal side to vehicle, the tread pattern can be asymmetric pattern, whereby the block stiffness, at the shoulder region away from the vehicle and being subject to receive great lateral force during cornering, can be increased. As a result, the driving stability can be more effectively improved.

Next, referring to drawings, other preferred embodiments of the present invention will be described.

Figure 9:
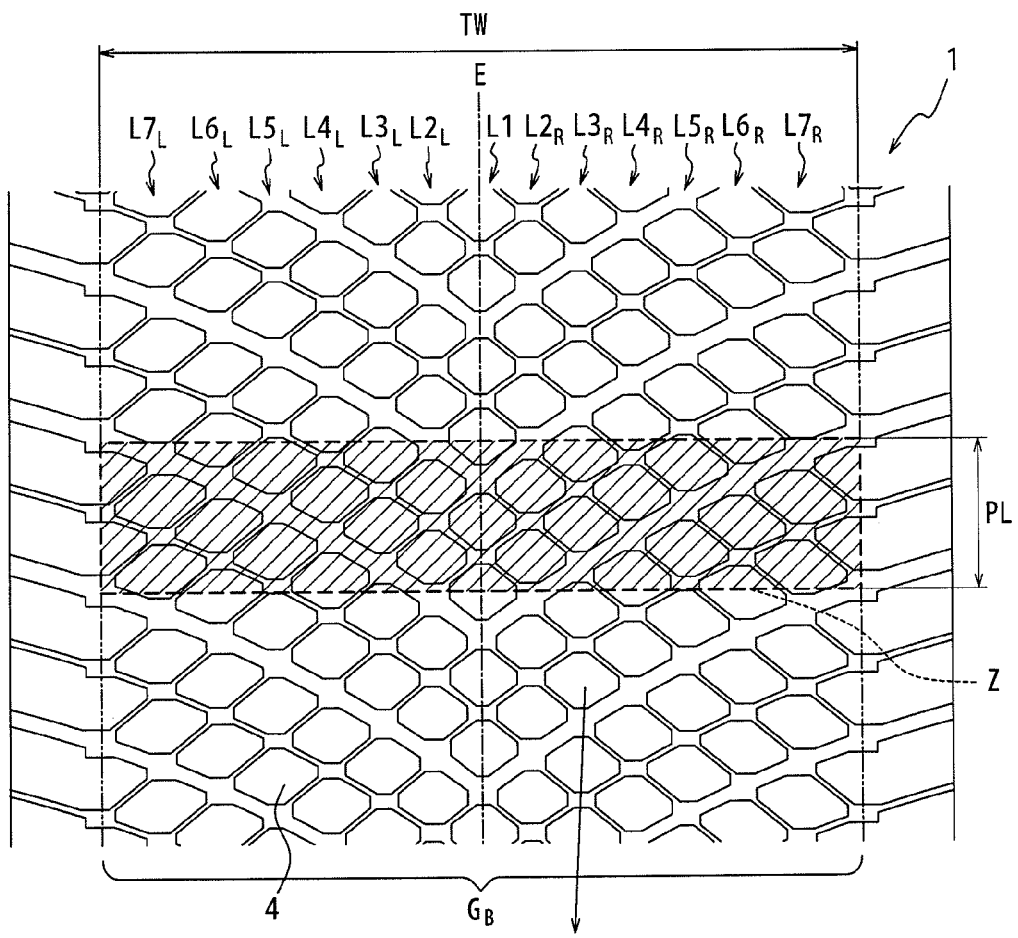
FIG. 9 is a partial development view showing a tread pattern of a pneumatic tire according to another embodiment of the present invention.
Figure 9:
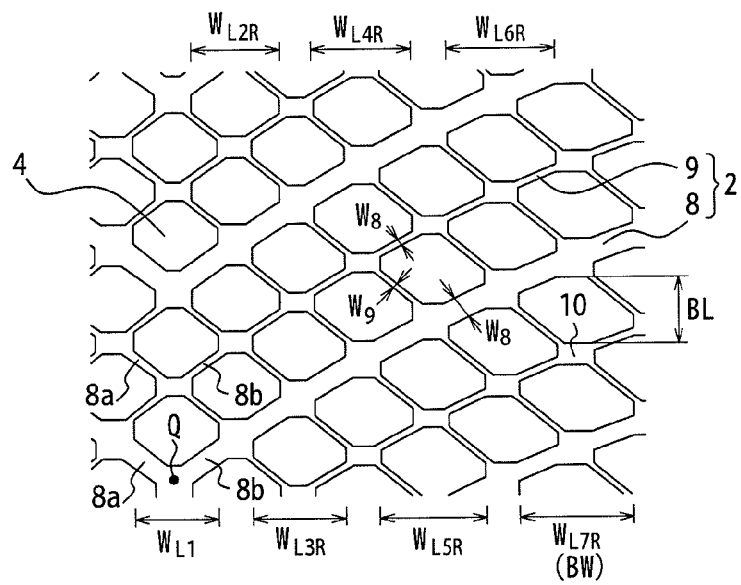

In the example shown in FIG. 9, the groove width $W_8$ of at least a part of the V-shaped grooves 8 is wider than the groove width $W_9$ of the crossing grooves 9 intersecting with the V-shaped groove 8. According to this, the V-shaped grooves 8 can be formed along the streamlines of water on the tread surface and more water can be evacuated out of tread surface through the wide V-shaped groove 8, whereby the water evacuation performance during wet running can be further improved.

Figure 10:
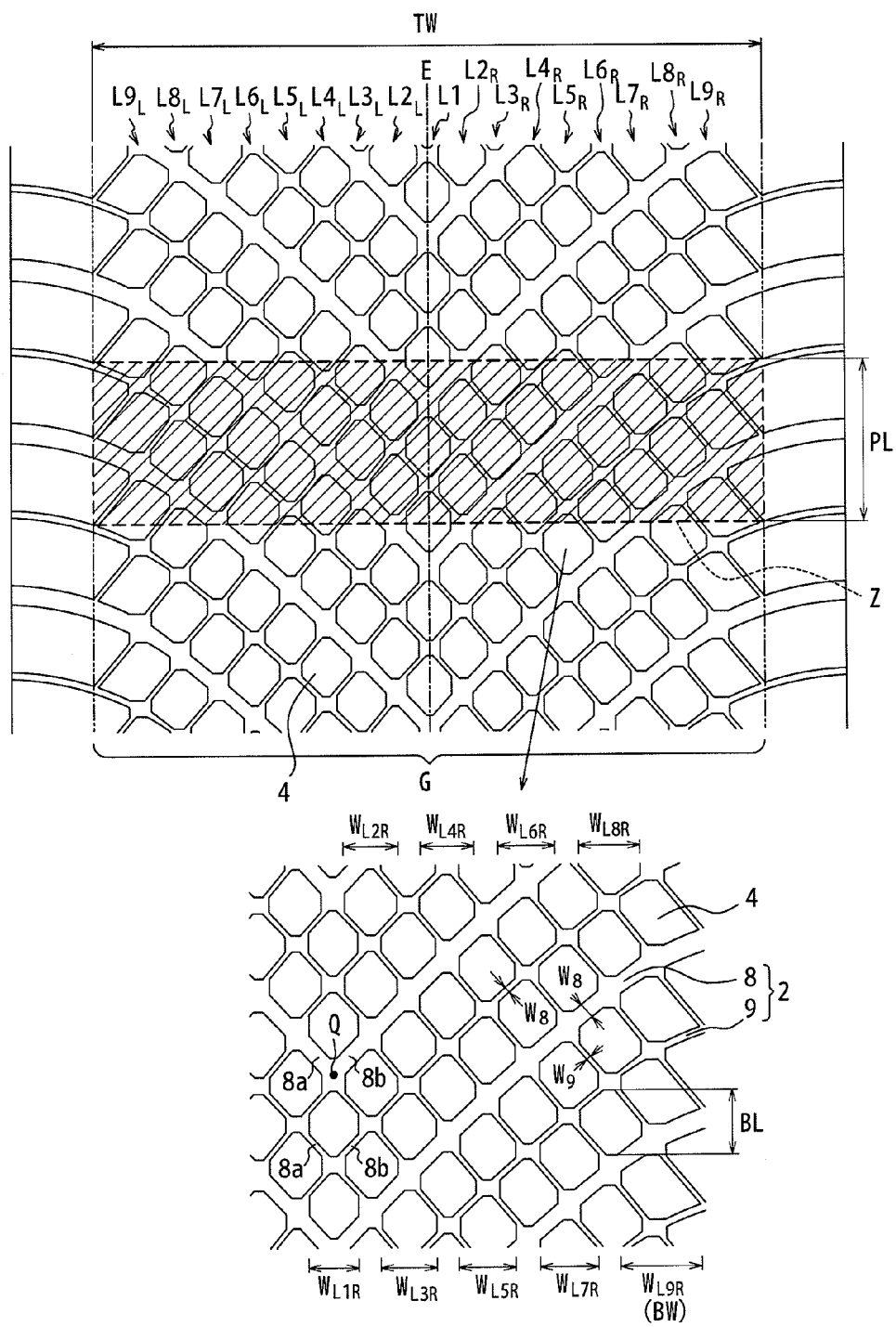
FIG. 10 is a partial development view showing a tread pattern of a pneumatic tire according to another embodiment of the present invention.

In the example shown in FIG. 10, in addition to the constitution in which the groove width $W_8$ of at least a part of the V-shaped grooves 8, inclined angle of the inclined grooves 8a, 8b forming the V-shape groove 8 with respect to the tire circumferential direction is more decreased than that of FIG. 9, i.e., the inclined grooves approach the tire circumferential direction. Specifically, the inclined angle with respect to the tire circumferential direction is equal to or less than 45 degree at the tire equator. According to this, the extending direction of the V-shape groove 8 can be closer to the streamline of water on tread surface, whereby the water evacuation performance can be effectively improved.

Figure 11:
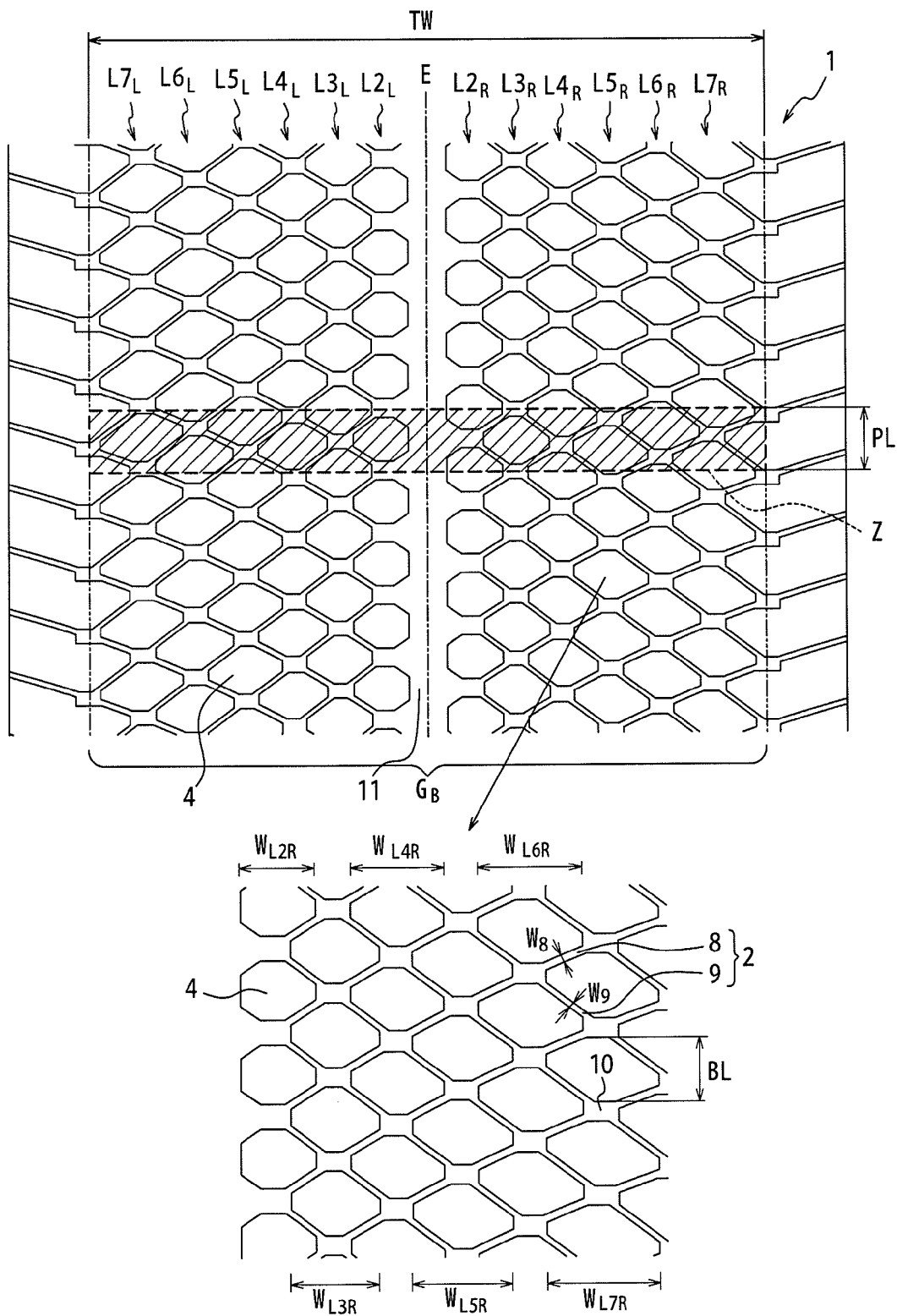
FIG. 11 is a partial development view showing a tread pattern of a pneumatic tire according to another embodiment of the present invention.

In the example shown in FIG. 11, a circumferential groove 11 extending along the tire circumferential direction is provided at tire equator E. The circumferential groove 11 includes a see-through portion linearly extending along the tire circumferential direction. According to this, water evacuation property can be improved by the circumferential groove 11 and edge element with respect to lateral direction can be increased, whereby cornering performance on snow road can be improved. The circumferential groove 11 whose groove bottom extends in zigzag shape may be applied. The term "extends in zigzag shape" means the inclined portions of the circumferential groove alternately reflectively extend.

Figure 12:
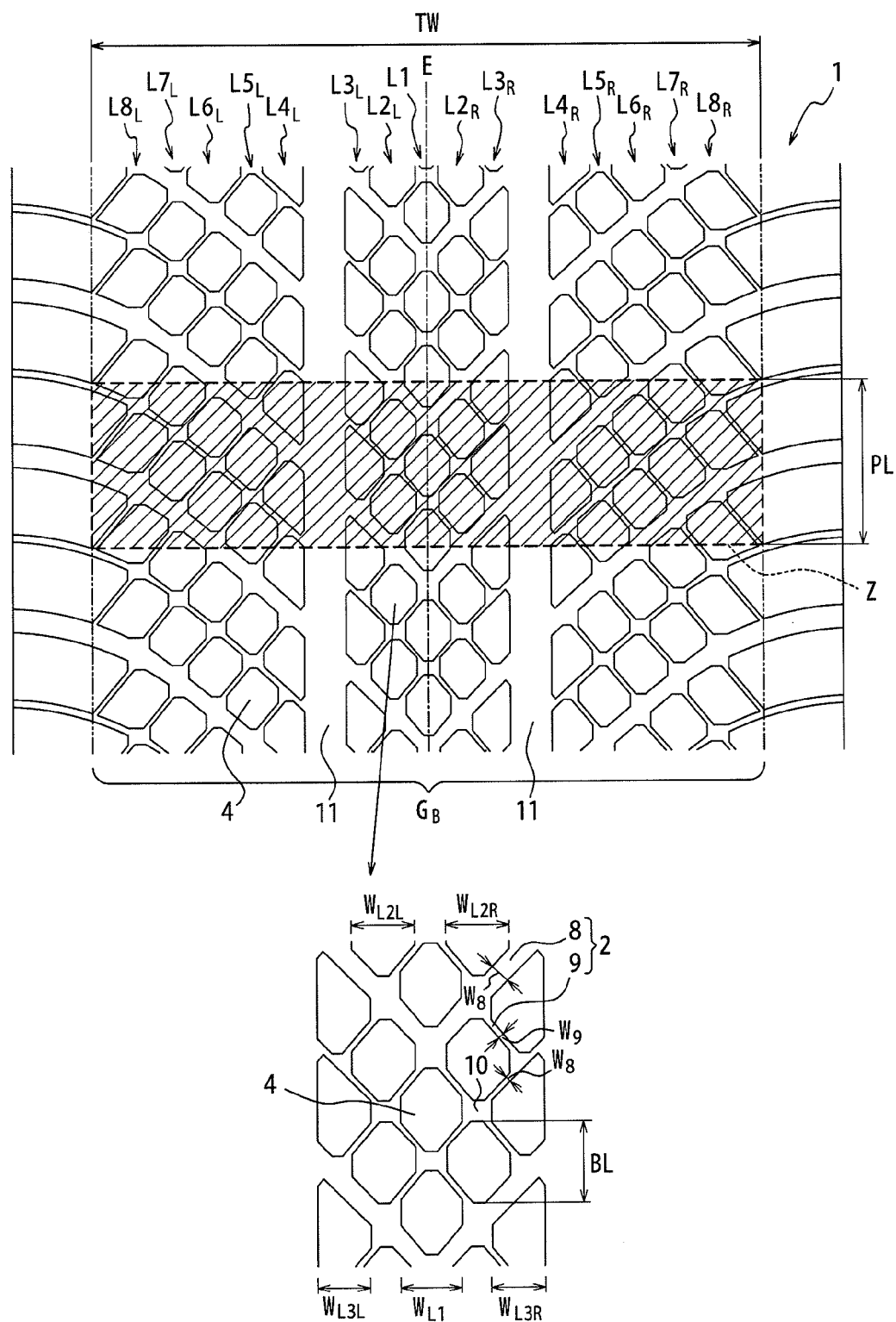
FIG. 12 is a partial development view showing a tread pattern of a pneumatic tire according to another embodiment of the present invention.
Figure 13:
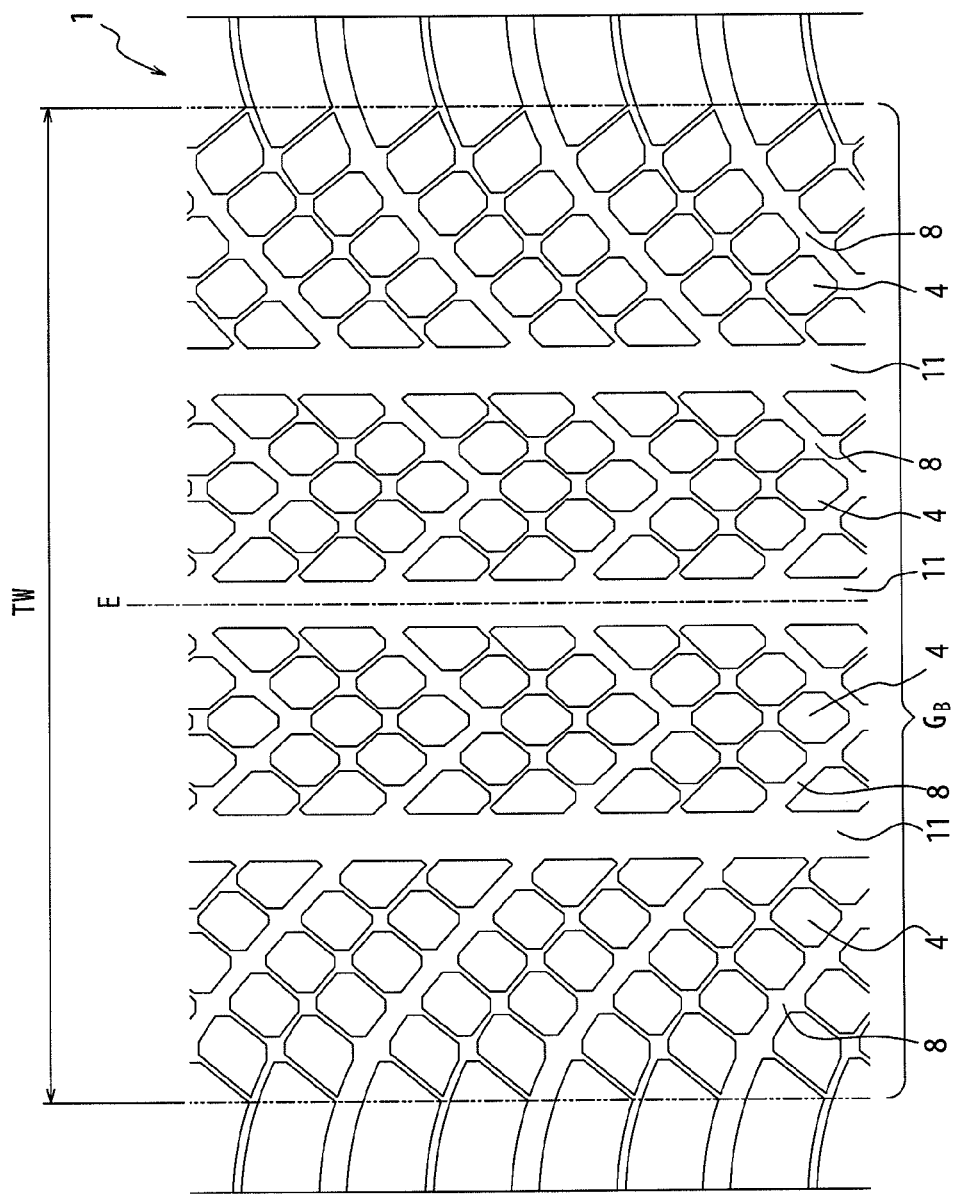
FIG. 13 is a partial development view showing a tread pattern of a pneumatic tire according to another embodiment of the present invention.

In the example as shown in FIG. 12, circumferential grooves 11 extending along the tire circumferential direction are respectively provided on both side of the tire equator E, preferably, 20% to 80% region of the tread contacting width TW from the tire equator E. According to this, water evacuation property can be further improved by the circumferential grooves 11 and edge element with respect to lateral direction can be increased, whereby cornering performance on snow road can be further improved. The circumferential main grooves 11 may be provided more than two as shown in FIG. 13. According to this, the water evacuation property and cornering performance can be further improved.

Although the present invention is described by reference to the embodiments, in the present invention, it is preferable that the negative ratio $N_n$ in each block group $G_{Bn}$ is within a range of 5% to 50%. In a case where the negative ratio $N_n$ is less than 5%, groove areas become too small to obtain sufficient water evacuation performance, and each block becomes too large to realize targeted edge effect of present invention. On the other hand, in a case where the negative ratio $N_n$ is more than 50%, the ground contact area becomes too small to obtain sufficient on-ice performance.

The foregoing descriptions merely show a part of an embodiment of the present invention, and the structures described above may be combined with each other and/or various modifications may be made unless such combinations/modifications digress from the spirit of the present invention. For example, in the aforementioned embodiments, although it is described that the tread portion is divided into a plurality of regions in tire width direction, the tread portion may be divided in tire circumferential direction or other directions. Further, the surface profile of the block 4 can be formed into, not only octagon, but circle, oval figure, other polygonal shapes or irregular-closed shapes. Further, although it is described that the circumferential main groove can be provided on tread portion, on behalf of or in addition to this, inclined lateral grooves (not shown) inclining with respect to the tire width direction can be provided to define a plurality of block groups next to the inclined lateral grooves. According to this, hydroplaning performance can be also improved. Here, the term "inclined lateral groove" means the groove whose width is wider than the minimum length between the blocks in same block group and extends inclining with respect to the tire width direction with length larger than the maximum width of the block. The circumferential main groove is not limited as long as including the see-through groove portion linearly extending in the tire circumferential direction, and wavy or curvy groove may be used for example. In addition, although not shown in the drawing, more than two block groups may be provided in the tread portion and, in at least one of them, it is preferable that the longitudinal lengths and the lateral lengths of the blocks are made equal. According to this, innate characteristic of the close-arranged small blocks, i.e., improvement of brake/traction performance on ice can be certainly obtained and other performances such as driving stability on dry/wet roads can be secured by residual portions of the tread. Further, in the embodiments after FIG. 4, the inclined grooves may not incline in opposite direction with respect to the tire circumferential direction but may incline in one direction. The inclined grooves may be provided at a part of the tread portion. For example, when the inclined grooves are provided at tread end regions, braking performance on snow can be particularly improved; when the inclined grooves are provided at center region, traction performance on snow can be particularly improved.

EXAMPLE

Next, tires of Examples 1 to 3 according to the present invention, a tire of Conventional Example 1 according to the conventional technique, and tires of Comparative Examples 1 and 2 were prepared, then performance evaluations regarding on-ice performance and other performances (driving stability performance and anti-wear performance) were conducted on these tires and will be described below.

The tire of Example 1 is radial tire with 205/55R16 in size for passenger vehicle, which has the tread pattern illustrated in FIG. 1 on the tread portion. The width TW of the tread portion 1 is 190 mm. The tire of Example 1 has the block groups $G_{B1}$, $G_{B3}$ in which the lateral lengths $BW_1$, $BW_3$ of the blocks 4 are larger than their longitudinal lengths $BL_1$, $BL_3$ ($BW_1 > BL_1$, $BW_3 > BL_3$), and the block group $G_{B2}$ in which the longitudinal lengths $BL_2$ of the blocks 4 are larger than their lateral lengths $BW_2$ ($BL_2 > BW_2$). The block number densities $D_1$ to $D_3$ are within the range of 0.003 (pieces/mm$^2$) to 0.04 (pieces/mm$^2$). The groove widths $W_{5a}$, $W_{5b}$ of the circumferential main grooves 5a, 5b are 10 mm. Other specifications regarding the tire of Example 1 are shown in Table 1.

The tire of Example 2 is radial tire with 205/55R16 in size for passenger vehicle, which has the tread pattern illustrated in FIG. 2 on the tread portion. The tire of Example 2 has the block group $G_{B1}$, in the first region $S_1$ locating on proximal side from vehicle in tire mounted state to the vehicle, in which the longitudinal lengths $BL_1$ of the blocks 4 are larger than their lateral lengths $BW_1$, and the block group $G_{B2}$, in the second region $S_2$, locating on distal side from the vehicle in tire mounted state to the vehicle, in which the lateral lengths $BW_2$ of the blocks 4 are larger than their longitudinal lengths $BL_2$. The block number densities $D_1$ and $D_2$ of the block groups $G_{B1}$, $G_{B2}$ of the first and second regions $S_1$, $S_2$ are within the range of 0.003 (pieces/mm$^2$) to 0.04 (pieces/mm$^2$). The groove width $W_{5a}$ of the circumferential main groove 5a is 10 mm. Other specifications regarding the tire of Example 2 are shown in Table 1.

The tire of Example 3 is radial tire with 205/55R16 in size for passenger vehicle, which has the tread pattern illustrated in FIG. 3 on the tread portion. The tire of Example 3 has basic constitution of the tire of Example 1, but each block 4 thereof is provided with sipes 7. The number of sipes 7 provided on the each block 4 is two (distance between the sipes is 5 mm) in the block groups $G_{B1}$, $G_{B3}$ of the first and third regions $S_1$, $S_3$, and three (distance between the sipes is 5 mm) in the block group $G_{B2}$ of the second region $S_2$. The block number densities $D_1$ and $D_2$ are within the range of 0.003 (pieces/mm$^2$) to 0.04 (pieces/mm$^2$). Other specifications regarding the tire of Example 3 are shown in Table 1.

Figure 14:
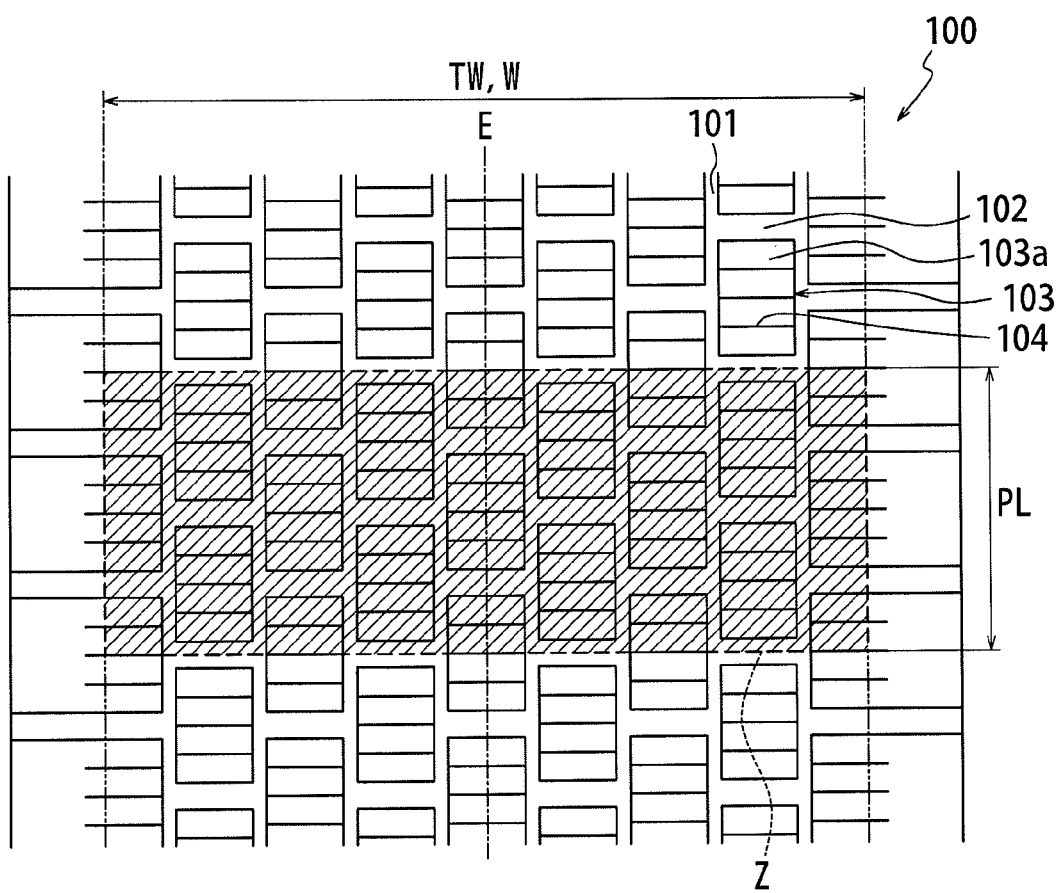
FIG. 14 is a partial development view showing a tread pattern of a conventional pneumatic tire (tire of Conventional Example 1).
Figure 15:
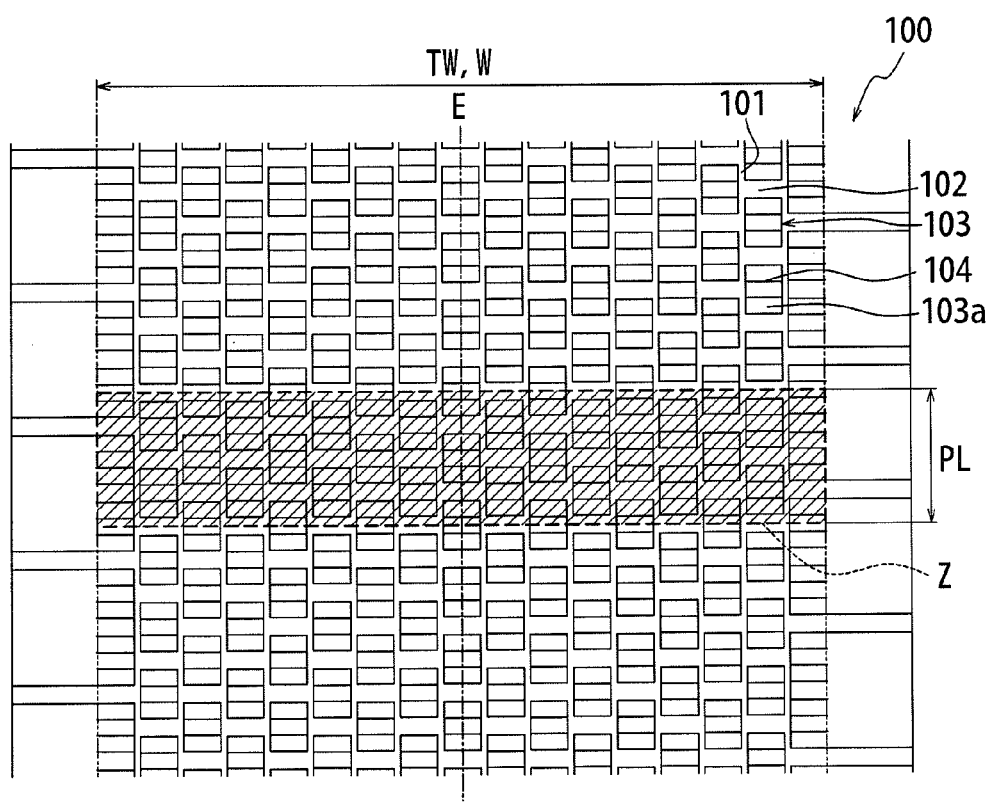
FIG. 15 is a partial development view showing a tread pattern of a comparative pneumatic tire (tire of Comparative Example 1).

For the sake of comparison, the tire of Conventional Example 1 and the tire of Comparative Example 1 which are radial tire with 205/55R16 in size for passenger vehicle were also prepared. The tire of Conventional Example 1 has the tread pattern as shown in FIG. 14, whose negative ratio in the whole tread portion is 31.9%. The tire of Comparative Example 1 has the tread pattern, as shown in FIG. 15, whose negative ratio in the whole tread portion is 32.6% The tire of Conventional Example 1 has, in the tread portion 100, a plurality of rectangle blocks 103 which are defined by longitudinal grooves 101 extending in the tire circumferential direction and lateral grooves 102 intersecting at right angle with the longitudinal grooves 101. The width of the longitudinal groove 101 is 3 mm and its depth is 8.5 mm. The width of the lateral groove is 7.9 mm and its depth is 8.5 mm. In addition, three straight sipes 104 are provided on each block 103. The tire of Comparative Example 1 has, in the tread portion 100, a plurality of rectangle blocks 103 which are defined by longitudinal grooves 101 extending in the tire circumferential direction and lateral grooves 102 intersecting at right angle with the longitudinal grooves 101. The width of the longitudinal groove 101 is 1.2 mm and its depth is 8.5 mm. The width of the lateral groove 102 is 4.5 mm and its depth is 8.5 mm. In addition, two straight 104 sipes are provided on each block 103. Other specifications are shown in Table 1.

Figure 16:
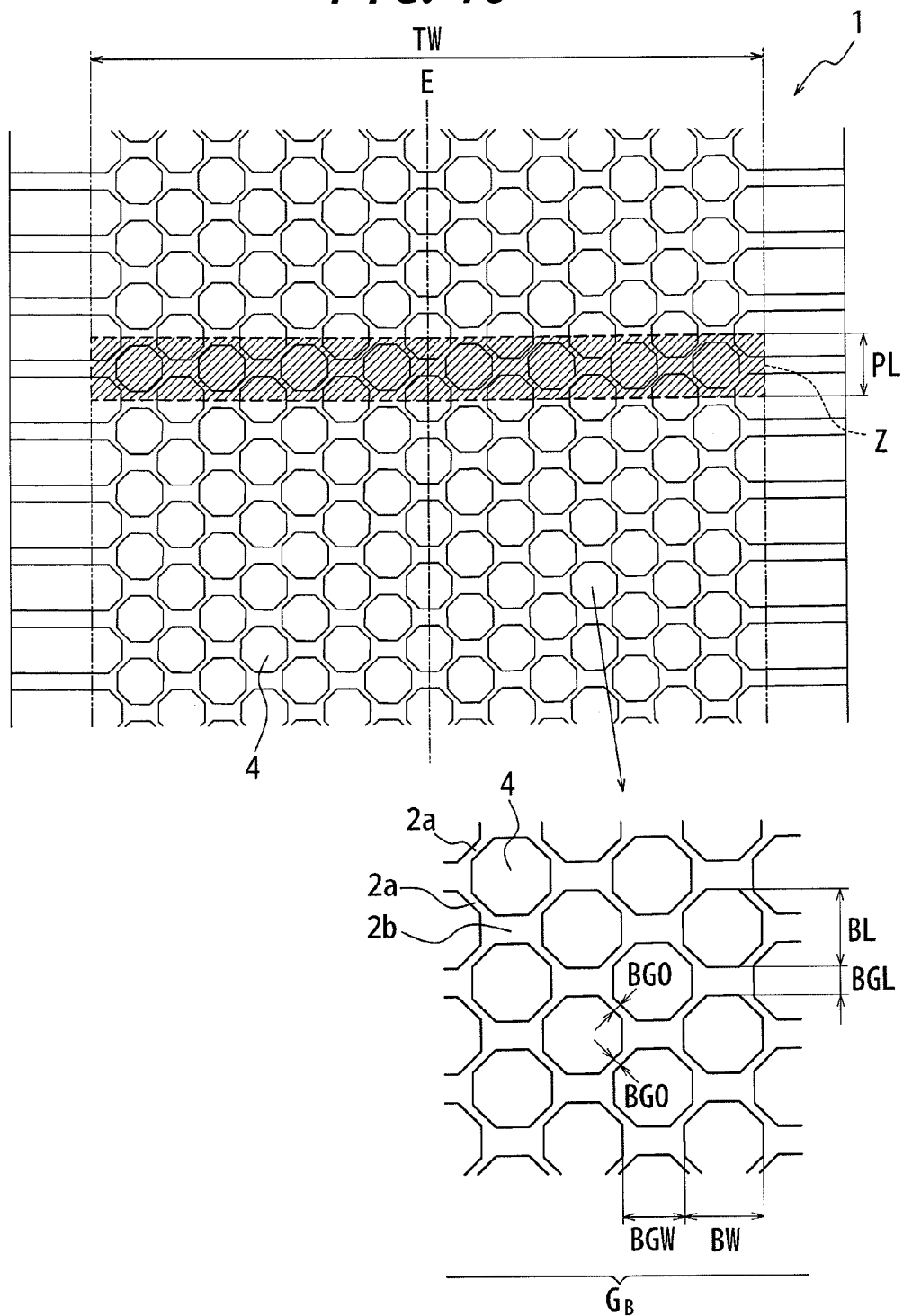
FIG. 16 is a partial development view showing a tread pattern of a comparative pneumatic tire (tire of Comparative Example 2).

For further comparison purpose, the tire of Comparative Example 2 which is radial tire with 205/55R16 in size and has, in the tread portion, the tread pattern shown in FIG. 16 was prepared. The tire is provided with, in the tread portion, block group $G_B$ whose block number density is within the range of 0.003 (pieces/mm$^2$) to 0.04 (pieces/mm$^2$). The shape of the each block 4 is octagon. Other specifications are shown in Table 1.

TABLE 1

|  |  | Example 1 | Example 2 | Example 3 | Conventional Example 1 | Comparative Example 1 | Comparative Example 2 |
|---|---|---|---|---|---|---|---|
| First region $S_1$ | Width $W_1$ of block group (mm) | 55.9 | 83.0 | 55.9 | — | — | — |
|  | Reference pitch length $PL_1$ (mm) | 47.48 | 47.48 | 47.48 | 35.9 | 18.0 | 18.0 |
|  | Circumferential length $BL_1$ of block (mm) | 15.0 | 20.2 | 15.0 | 28.0 | 13.5 | 13.5 |
|  | Widthwise length $BW_1$ of block (mm) | 20.2 | 15.0 | 20.2 | 19.7 | 9.9 | 13.5 |
|  | Distance $BGL_1$ between blocks (mm) | 8.8 | 3.5 | 8.8 | — | — | 4.5 |
|  | Distance $BGW_1$ between blocks (mm) | 3.5 | 9.0 | 3.5 | — | — | 9.8 |
|  | Distance $BGO_1$ between blocks (mm) | 1.4 | 1.5 | 1.4 | — | — | 1.1 |
|  | Hight of blocks (mm) | 8.5 | 8.5 | 8.5 | 8.5 | 8.5 | 8.5 |
|  | Negative ratio $N_1$ (%) | 19.3 | 20.35 | 19.3 | 31.9 | 32.6 | 27.9 |
|  | The number of block rows (lines) | 5 | 7 | 5 | 9 | 17 | 17 |
|  | The number $a_1$ of blocks (piece) | 10 | 14 | 10 | 9 | 17 | 17 |
|  | Block number density $D_1$ (piece/mm$^2$) | 0.00467 | 0.00446 | 0.00467 | 0.00194 | 0.00737 | 0.00689 |
| Second region $S_2$ | Width $W_2$ of block group (mm) | 58.29 | 97.0 | 58.29 | — | — | — |
|  | Reference pitch length $PL_2$ (mm) | 47.48 | 47.48 | 47.48 | 35.9 | 18.0 | 18.0 |
|  | Circumferential length $BL_2$ of block (mm) | 20.2 | 15.0 | 20.2 | 28.0 | 13.5 | 13.5 |
|  | Widthwise length $BW_2$ of block (mm) | 15.0 | 20.2 | 15.0 | 19.7 | 9.9 | 13.5 |
|  | Distance $BGL_2$ between blocks (mm) | 3.5 | 8.8 | 3.5 | — | — | 4.5 |
|  | Distance $BGW_2$ between blocks (mm) | 9.0 | 3.5 | 9.0 | — | — | 9.8 |
|  | Distance $BGO_2$ between blocks (mm) | 1.5 | 1.4 | 1.5 | — | — | 1.1 |
|  | Hight of blocks (mm) | 8.5 | 8.5 | 8.5 | 8.5 | 8.5 | 8.5 |
|  | Negative ratio $N_2$ (%) | 20.1 | 20.63 | 20.1 | 31.9 | 32.6 | 27.9 |
|  | The number of block rows (lines) | 5 | 8 | 5 | 9 | 17 | 17 |
|  | The number $a_2$ of blocks (piece) | 10 | 16 | 10 | 9 | 17 | 17 |
|  | Block number density $D_2$ (piece/mm$^2$) | 0.00452 | 0.00438 | 0.00452 | 0.00194 | 0.00737 | 0.00689 |
| Third region $S_3$ | Width $W_3$ of block group (mm) | 55.9 | — | 55.9 | — | — | — |
|  | Reference pitch length $PL_3$ (mm) | 47.48 | — | 47.48 | 35.9 | 18.0 | 18.0 |
|  | Circumferential length $BL_3$ of block (mm) | 15.0 | — | 15.0 | 28.0 | 13.5 | 13.5 |
|  | Widthwise length $BW_3$ of block (mm) | 20.2 | — | 20.2 | 19.7 | 9.9 | 13.5 |
|  | Distance $BGL_3$ between blocks (mm) | 8.8 | — | 8.8 | — | — | 4.5 |
|  | Distance $BGW_3$ between blocks (mm) | 3.5 | — | 3.5 | — | — | 9.8 |
|  | Distance $BGO_3$ between blocks (mm) | 1.4 | — | 1.4 | — | — | 1.1 |
|  | Hight of blocks (mm) | 8.5 | — | 8.5 | 8.5 | 8.5 | 8.5 |
|  | Negative ratio $N_3$ (%) | 19.3 | — | 19.3 | 31.9 | 32.6 | 27.9 |
|  | The number of block rows (lines) | 5 | — | 5 | 9 | 17 | 17 |
|  | The number $a_3$ of blocks (piece) | 10 | — | 10 | 9 | 17 | 17 |
|  | Block number density $D_3$ (piece/mm$^2$) | 0.00467 | — | 0.00467 | 0.00194 | 0.00737 | 0.00689 |

(Performance Evaluation)

Above Example tires were mounted to vehicle under being assembled with rim of 6.5J×16 in size and filled with inner pressure of 220 kPa (relative pressure). Then, the following tests were carried out to evaluate their performances.

(1) Evaluation Test on Braking Performance on Ice

Evaluation test on the braking performance on ice was carried out by measuring a braking distance when full brake was applied from a speed of 20 km/h on ice road. The evaluation results are shown in Table 2. Table 2 shows index of the results of the tires of Examples 1-3 and Comparative Examples 1, 2 to the result of the tire of Conventional Example 1 with regarding the result of the Conventional Example 1 as 100. The larger the value of the result is the better braking performance on ice is.

(2) Driving Stability on Dry Road

Evaluation test on driving stability on dry road was carried out by test driver. The test driver drove at various sports driving mode on dry load and evaluated based on his feeling. The evaluation results are shown in Table 2. Table 2 shows index of the results of the tires of Examples 1-3 and Comparative Examples 1, 2 to the result of the tire of Conventional Example 1 with regarding the result of the Conventional Example 1 as 100. The larger the value of the result is the better driving stability on dry road is.

(3) Driving Stability on Wet Road

Evaluation test on driving stability on wet road was carried out by test driver. The test driver drove at various sports driving mode on wet load and evaluated based on his feeling. The evaluation results are shown in Table 2. Table 2 shows index of the results of the tires of Examples 1-3 and Comparative Examples 1, 2 to the result of the tire of Conventional Example 1 with regarding the result of the Conventional Example 1 as 100. The larger the value of the result is the better driving stability on wet road is.

(4) Anti-Wear Performance at Shoulder Region

Anti-wear performance was carried out by measuring the residual groove depth near the tread end after driving 5000 km at various driving mode on dry normal load and then evaluating from the measured residual groove depth. The evaluation results are shown in Table 2. The evaluation results are shown in Table 2. Table 2 shows index of the results of the tires of Examples 1-3 and Comparative Examples 1, 2 to the result of the tire of Conventional Example 1 with regarding the result of the Conventional Example 1 as 100. The larger the value of the result is the better anti-wear performance at shoulder region is.

TABLE 2

|  | Example 1 | Example 2 | Example 3 | Conventional Example 1 | Comparative Example 1 | Comparative Example 2 |
|---|---|---|---|---|---|---|
| Braking performance on ice | 138 | 137 | 144 | 100 | 130 | 140 |

TABLE 2-continued

|  | Example 1 | Example 2 | Example 3 | Conventional Example 1 | Comparative Example 1 | Comparative Example 2 |
|---|---|---|---|---|---|---|
| Driving stability on dry road | 123 | 120 | 115 | 100 | 97 | 112 |
| Driving stability on wet road | 125 | 118 | 113 | 100 | 97 | 110 |
| Anti-wear performance at shoulder retion | 113 | 115 | 111 | 100 | 96 | 105 |

From the evaluation results shown in Table 2, according to the present invention, further to the dramatic improvement of on-ice performance, balance with other performances can be possible. According to the tire of Example 1, in addition to the improvement of on-ice performance, driving stability on dry/wet roads in particular can be improved. The tire of Example 2 have efficacy for anti-wear performance at shoulder region. The tire of Example 3 can most improve the braking performance on ice while securing other performances.

INDUSTRIAL APPLICABILITY

According to the present invention, in addition to dramatic improvement of on-ice performance, it is possible to balance with other performances.

EXPLANATION OF REFERENCE CHARACTERS

1 Tread portion
2a Longitudinal groove
2b Lateral groove
4 Block
5a, 5b, 5c Circumferential main groove
$G_{B1}$-$G_{B3}$ Block group
$PL_1$-$PL_3$ Reference pitch length of block
$W_1$-$W_3$ Width of block group
$Z_1$-$Z_3$ Reference zone
7 Sipe

The invention claimed is:

1. A pneumatic tire comprising:
in a tread portion, at least one block group, the block group comprising a plurality of independent blocks defined by grooves; and
in the tread portion, at least one circumferential main groove comprising a see-through groove portion, the see-through groove portion linearly extending in the tire circumferential direction,
wherein block number density D (pieces/mm²) of the block group is within a range of 0.003 (pieces/mm²) to 0.04 (pieces/mm²), the block number density D being represented by the formula:

$D = a/\{PL \times W \times (1-N/100)\}$ wherein PL (mm) represents a reference pitch length of the block in the block group, W (mm) represents a width of the block group, a (pieces) represents the number of the blocks existing in a reference zone of the block group, the reference zone being demarcated by the reference pitch length PL and the width W, and N (%) represents a negative ratio in the reference zone,
wherein the at least one block group includes a block having a lateral length being larger than a longitudinal length thereof,
wherein in the block group, a distance BGL between blocks adjacent to each other in the tire circumferential direction is larger than a distance BGO between blocks adjacent to each other in an oblique direction with respect to the tire circumferential direction, and
wherein in the block group, a distance BGW between blocks adjacent to each other in the tire width direction is smaller than a length BW of the blocks in the tire width direction.

2. The pneumatic tire according to claim 1, comprising at least two block groups in the tread portion, wherein the longitudinal length of each block in one of the at least two block groups is larger than the lateral length thereof, and the lateral length of each block in a residual block group of the at least two block groups is larger than the longitudinal length thereof.

3. The pneumatic tire according to claim 1, wherein the tread portion has a center region and shoulder regions, the center region being, on both side of a tire equatorial plane, 10% to 40% of a tread width for each side, each of the shoulder regions being, from each tread end in the tire width inward direction, 40% to 10% of the tread width;
wherein the blocks in the center region and the blocks in the shoulder region respectively compose the block groups,
wherein the longitudinal length of each block in the center region is larger than the lateral length thereof, and the lateral length of each block in the shoulder region is larger than the longitudinal length thereof.

4. The pneumatic tire according to claim 1, comprising at least three block groups, wherein the longitudinal length of the each block in at least one of the three block groups equals to the lateral length thereof.

5. The pneumatic tire according to claim 1, wherein at least one sipe is provided on at least one block in at least one block group.

6. The pneumatic tire according to claim 2, wherein the longitudinal length of each block in the block group that comprises the block having the longitudinal length being larger than the lateral length thereof is larger than the longitudinal length of each block in the block group that comprises the block having the lateral length being larger than the longitudinal length thereof.

* * * * *